Nov. 27, 1956    W. H. PHELPS    2,771,959
SHARP-TOOTHED TIRE ENGAGING MEMBERS
FOR DRIVING VEHICLE WHEELS
Filed Feb. 19, 1954    3 Sheets—Sheet 1
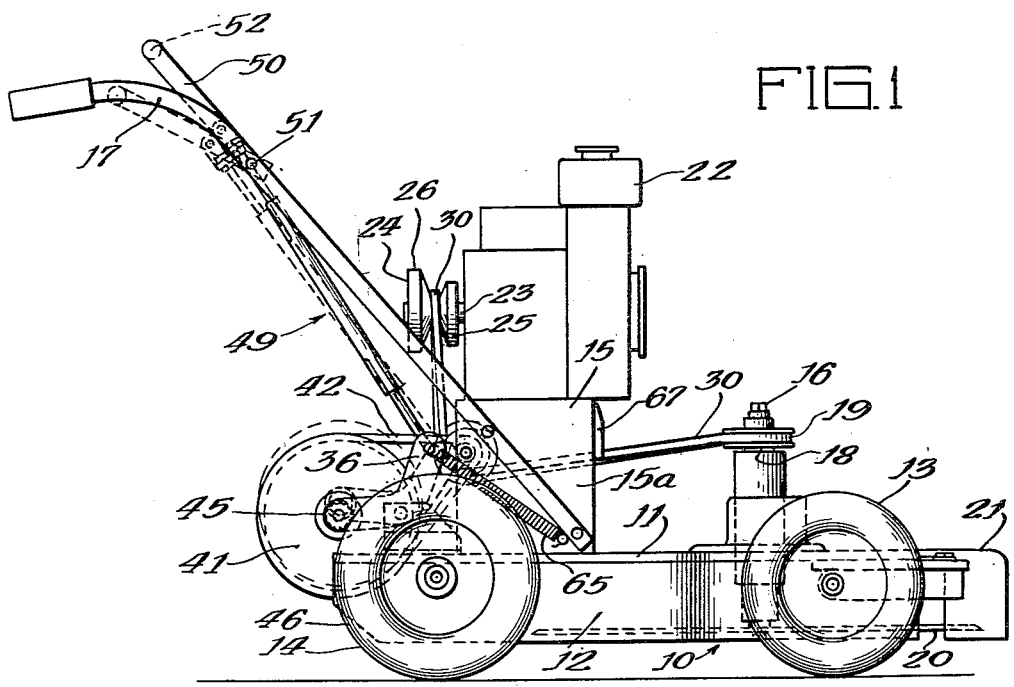
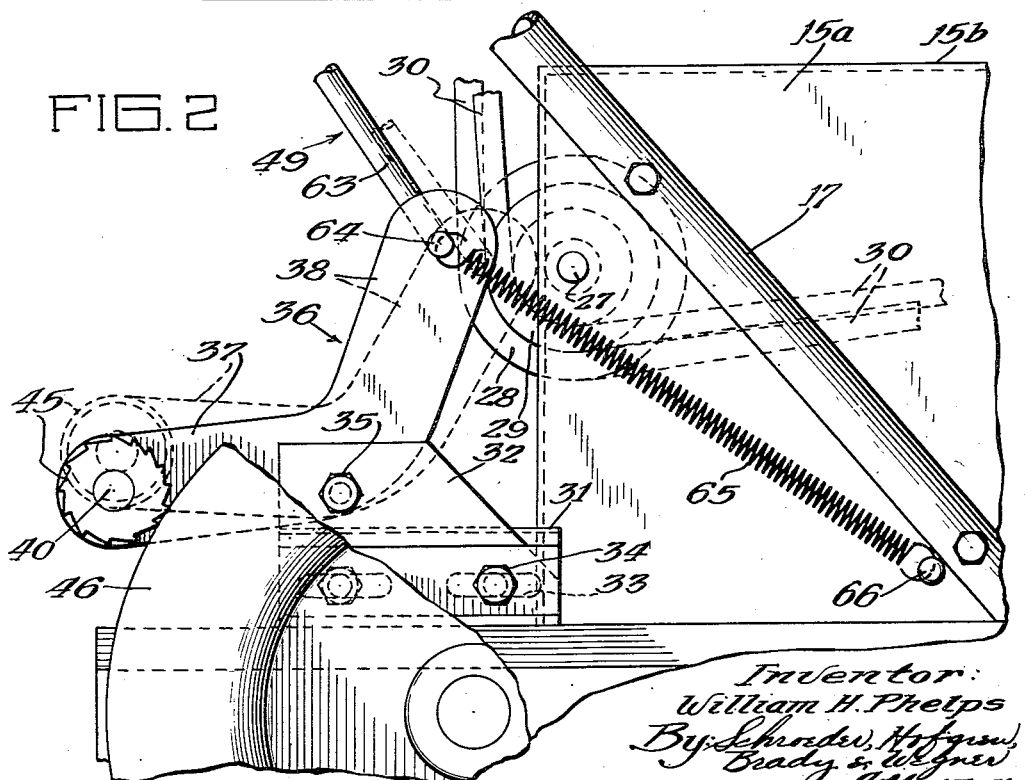
Inventor:
William H. Phelps
By Schroder, Hofgren,
Brady & Wegner
Attorneys

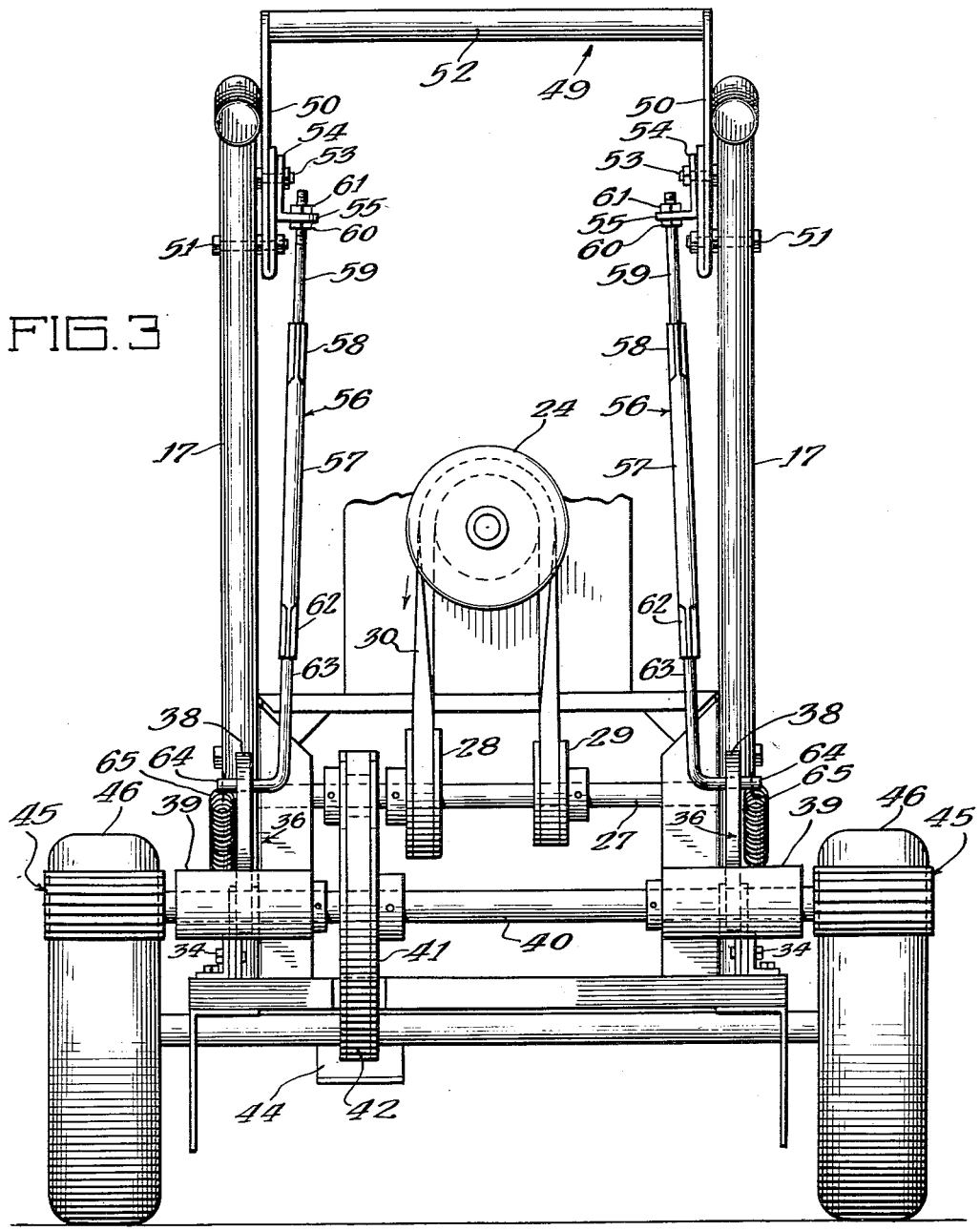

Nov. 27, 1956  W. H. PHELPS  2,771,959
SHARP-TOOTHED TIRE ENGAGING MEMBERS
FOR DRIVING VEHICLE WHEELS
Filed Feb. 19, 1954  3 Sheets-Sheet 3
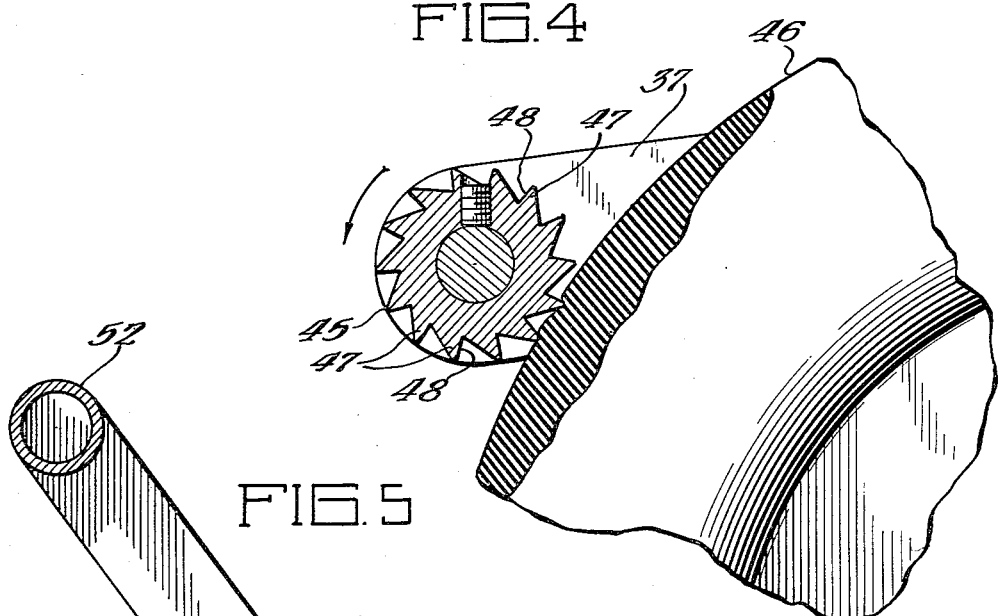
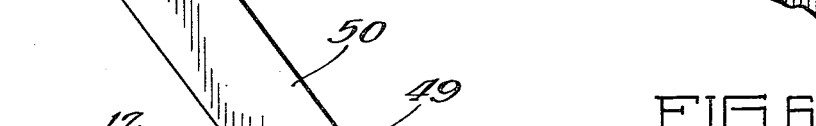
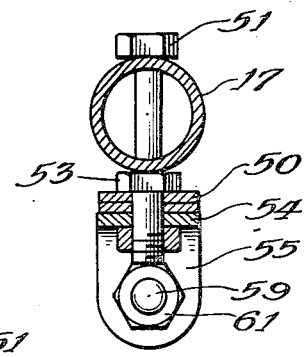
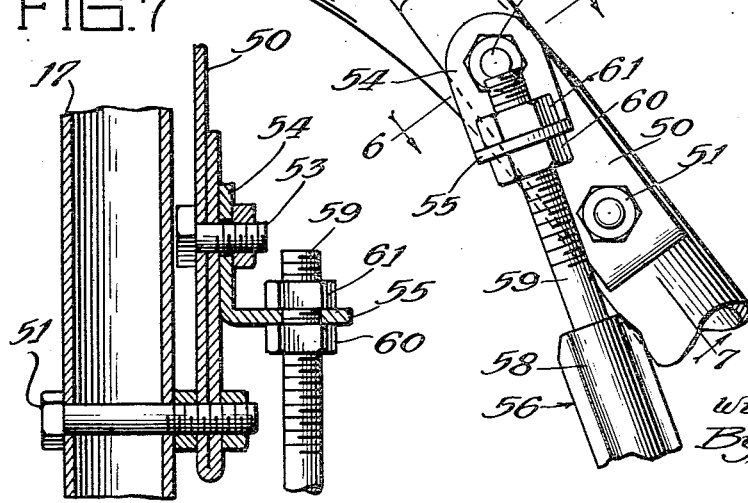
Inventor:
William H. Phelps
By Schroeder, Hofgren,
Brady & Wegner
Attorneys United States Patent Office 2,771,959
Patented Nov. 27, 1956

2,771,959

SHARP-TOOTHED TIRE ENGAGING MEMBERS FOR DRIVING VEHICLE WHEELS

William H. Phelps, Ralston, Nebr.

Application February 19, 1954, Serial No. 411,482

6 Claims. (Cl. 180—74)

This invention relates to a drive mechanism for power driven wheeled vehicles such as lawn mowers, rotary snow plows and the like.

The principal object of the invention is to provide a light, rugged and inexpensive drive mechanism for power mowers and other wheeled vehicles which requires but little basic modification from a hand propelled unit.

Another object of the invention is to provide a mower or other hand guided implement which has a driving mechanism that is easily engaged or disengaged, and that is light enough in weight that the implement may be readily hand propelled when desired.

Another object is to provide a drive mechanism utilizing a specially shaped toothed gear which engages a smooth surfaced pneumatic or semi-pneumatic tire in such a way that a tooth engaging the tire pushes up a transverse ridge of rubber against which the tooth exerts its driving force to turn the mower wheels.

Still another object is to provide a vehicle in which the motor may be completely disengaged for starting so as to permit the use of a motor of smaller horsepower than is otherwise possible.

A preferred embodiment of the invention is illustrated in the accompanying drawings as applied to a mower of the type in which a four wheeled platform has a horizontally rotating cutter blade; and Fig. 1 is a side elevation of a mower equipped with the driving mechanism of the invention, the mechanism for engaging and disengaging the drive gears with the drive tires being shown in full line in engaged position and in broken lines in disengaged position;

Fig. 2 is a fragmentary detailed side elevational view, on an enlarged scale, of the mechanism for disengaging the drive gear, the disengaged position of the drive gear being shown in broken lines;

Fig. 3 is a rear elevational view of a mower equipped with the mechanism;

Fig. 4 is an enlarged fragmentary view, partly in section, of a drive gear and drive tire, showing the engagement between the teeth of the drive gear and the running surface of the tire;

Fig. 5 is an enlarged fragmentary sectional view of the upper portion of the toggle linkage for controlling the engagement of the drive gears;

Fig. 6 is a section taken as indicated along the line 6—6 of Fig. 5; and

Fig. 7 is a section taken as indicated along the line 7—7 of Fig. 5.

Referring to the drawings in greater detail, and referring particularly to Fig. 1, a power mower, which is illustrative of the type of vehicle in which the invention may be employed, consists of a frame, indicated generally at 10, having a platform 11 and side plates 12. The frame 10 is supported on a pair of front wheels 13 and a pair of rear wheels 14. Mounted upon the frame are a motor support 15 having side plates 15a and a top plate 15b (see Fig. 2), a mower assembly 16 and a pair of handles 17 for guiding the mower which are provided with hand grips 17a. The mower head is of a conventional type having a vertical spindle 18 provided at its upper end with a pulley 19 and at its lower end with a horizontally disposed cutter blade 20. At the front of the frame 10 is a guard 21.

A gasoline motor, indicated generally at 22 is mounted on the top plate 15b of the motor support 15 and has a horizontally disposed shaft 23 at the rear end of which is a clutch type motor pulley 24 having relatively separable conical plates 25 and 26.

As best seen in Fig. 3, an intermediate shaft 27 is journaled in bushings in the side plates 15a of the motor support and has power pulleys 28 and 29 keyed thereon flanking the clutch pulley 24. A power V-belt 30 extends around the clutch type motor pulley 24, the power pulley 28, forward between the upright sides 15a and beneath the top plate 15b of the motor support 15, around the pulley 19 on the mower shaft, and returns to the clutch type motor pulley 24 over the second power pulley 29. The motor 22 may be relieved of load when starting by separating the conical plates 25 and 26 of the clutch type motor pulley 24, so as to loosen the power belt 30. Preferably a belt guard 67 (broken away in Fig. 1) overlies the power belt 30 and extends below it on both sides.

As best seen in Fig. 2, on the platform 11, and extending rearwardly from the side plates 15a of the motor support are a pair of angle members 31 upon which are slidably mounted a pair of drive shaft support plates 32, which have longitudinal slots 33 to receive bolts 34 which extend through said slots and through apertures in the angle members 31 to permit longitudinal adjustment of said plates 32. Pivotally mounted on the drive shaft support plates 32 on bolts 35 are a pair of bell cranks, indicated generally at 36, which have rearwardly extending arms 37 and forwardly and upwardly extending arms 38. Formed integrally with the outer extremities of the arms 37 of the bell cranks are a pair of elongated transverse journal members 39 in which a drive shaft 40 is rotatably supported, the drive shaft 40 being provided with a pulley 41. A drive belt 42 extends around a drive pulley 43 on the intermediate shaft 27 and around the pulley 41 so that when the motor 22 is operated to rotate the power pulleys 26 and 29 the drive shaft 40 will also rotate. The direction of rotation of the motor pulley is indicated by the arrow in Fig. 3. Mounted beneath the platform 11 is a V-shaped deflector plate 44 which prevents grass clippings and dirt from fouling the pulley 42.

At each end of the drive shaft 41 there is a toothed drive gear 45, said drive gears 45 being positioned in alignment with pneumatic or semi-pneumatic drive tires 46 on the rear wheels 14. As best seen in Fig. 4, the toothed drive gears 45 have teeth 47 which have slightly undercut surfaces 48 in the direction of rotation of the gears so that each tooth bites into the effectively smooth running surface of the drive tire 46 and pushes up a transverse ridge of rubber against which the tooth exerts its driving force to turn the mower wheels. The diameters of the toothed drive gears 45 and of the tires 46 are coordinated to provide a desired traveling speed for the mower. For certain types of grass it is desirable to have the mower travel more slowly than for other types, and the mower speed is readily set for the conditions under which it is to be used by installing larger or smaller drive gears 45. When the tires 46 are semi-pneumatic the durometer hardness should be below 50 for proper engagement between the gears 45 and tires 46. The term "effectively smooth" is used with reference to the tires 46 to mean that the running surfaces of the tires are devoid of any such transversely extending pattern, or grooves, as would interfere with the even and uniform engagement of the gears 45 with the tire surface.

In order that the gears 45 may be either engaged or disengaged with the drive tire 46, a toggle linkage mechanism, indicated generally at 49, details of which are shown in Figs. 5-7, is connected to the arm 38 of the bell crank and to the upper portions of the handles 17, as seen in Fig. 1.

As best seen in Fig. 3, the toggle linkage 49 includes a pair of arms 50 which are pivotally connected adjacent the upper ends of the handles 17 on threaded studs 51, and a cross bar 52 connects the two arms 50. Referring now to Figs. 5-7, above the pivots provided by the threaded studs 51 are screws 53 to swingingly receive brackets 54 which have apertured inwardly extending portions 55 to receive the upper ends of a pair of elongated links, indicated generally at 56. Each of the elongated links 56 has a tubular central portion 57 which has its upper end portion 58 pressed into close engagement with a threaded stud 59 to which the tubular portion is spot welded, and the threaded stud 59 extends through the aperture in the bracket 55 and is provided with nuts 60 and 61 which flank the bracket to permit longitudinal adjustment of the links 56. The tubular central parts 57 of the links 56 have their lower end portions 62 pressed and spot welded to the upright arms of L-shaped link attaching portions 63 which have outturned lower ends 64 extending through apertures in the arms 38 of the bell cranks 36. As best seen in Fig. 2, the out-turned portions 64 of the links 56 have holes adjacent their outer ends to receive tension springs 65 which are also hooked to studs 66 on the motor support side plates 15a adjacent the lower ends of the handle 17.

The operation of the gear engaging mechanism is believed to be clear. The tension springs 65 urge the arms 38 of the bell cranks downwardly and forwardly, so that the drive gears 45 are normally disengaged from the drive tire 46, and the toggle linkage 59 is in the broken line position of Fig. 1. The drive gears 45 are moved into engagement with the drive tire 46 by grasping the cross bar 52 of the toggle linkage and thrusting the arms 50 forwardly about the pivots 51 to the full line position of Fig. 1. The position of the pins 53 for the brackets 54 causes the bell cranks to swing against the tension of the springs 65 to throw the drive gears 45 into firm engagement with the drive tire 46, as seen in Fig. 4. The turnbuckle construction of the links 56 permits them to be shortened in order to provide a correct driving adjustment between the gears 45 and the tire 46, and the toggle action between the arms 50 and the links 58 holds the gears 45 in firm engagement with the tire 46.

There are several additional advantages in the particular construction shown in the drawings. Thus, for example, the use of a long power belt 30 which extends forward under the motor tends to make the belt heat less in use, due to the relatively long travel between pulleys which gives it an opportunity to cool. Relatively long belt life is the result of this construction. Furthermore, the relatively high motor support 15 places the motor 22 sufficiently high above the ground that it receives very little dust and grass clippings as the mower operates. This is an important factor in avoiding carburetor failures.

The foregoing detailed description is given for clearness of understanding only and no unnecessary limitations are to be understood therefrom, as some modifications will be obvious to those skilled in the art.

The belt drive for the mower blade and the drive gears, as well as the bell crank mounting for the drive gears, is described and claimed in my Patent 22,736,389, issued February 28, 1956, on application Serial No. 255,065, filed November 6, 1951.

I claim:

1. In a drive mechanism for a wheeled vehicle: a drive tire on a wheel of the vehicle which is composed of relatively soft, resilient material and has an effectively smooth running surface; and a drive shaft provided with a drive gear adapted to engage the running surface of the tire, said gear having teeth which present a sharp forward edge which bites into the tire as the gear rotates to push up a sharply angled ridge of tire material ahead of each tooth as it engages with the tire against which the tooth exerts its driving force.

2. The device of claim 1 in which the drive tire is a pneumatic tire.

3. The device of claim 1 in which the drive tire is a semi-pneumatic tire composed of a material having a durometer hardness below 50.

4. The device of claim 1 in which the teeth on the drive gear are forwardly undercut.

5. In a drive mechanism for a wheeled vehicle: a drive tire on a wheel of the vehicle which is composed of relatively soft, resilient material and has an effectively smooth running surface; and a drive shaft provided with a drive gear adapted to engage the running surface of the tire, said gear having teeth which are generally triangular in cross section and have a forwardly facing, acutely angled edge which bites into the tire as the gear rotates to push up a sharply angled ridge of tire material ahead of each tooth as it engages with the tire against which the tooth exerts its driving force.

6. In a drive mechanism for a wheeled vehicle: a drive tire on a wheel of the vehicle which is composed of relatively soft, resilient material and has an effectively smooth running surface; and a drive shaft provided with a drive gear adapted to engage the running surface of the tire, said gear having teeth which have flat forward faces and rear faces disposed at an acute angle to said forward faces to provide a forwardly facing edge which bites into the tire as the gear rotates to push up a sharply angled ridge of tire material ahead of each tooth as it engages with the tire against which the tooth exerts its driving force.

References Cited in the file of this patent

UNITED STATES PATENTS

| | | |
|---|---|---|
| 1,124,162 | Monahan | Jan. 5, 1915 |
| 1,897,944 | Carter | Feb. 14, 1933 |
| 2,017,524 | Bolens | Oct. 15, 1935 |
| 2,054,644 | Wulfert | Sept. 15, 1936 |
| 2,082,600 | Squires | June 1, 1937 |
| 2,429,378 | Stuebner | Oct. 21, 1947 |
| 2,453,999 | Melling | Nov. 16, 1948 |
| 2,519,749 | Edwards | Aug. 22, 1950 |
| 2,736,389 | Phelps | Feb. 28, 1956 |

FOREIGN PATENTS

| | | |
|---|---|---|
| 140,622 | Australia | Apr. 28, 1949 |
| 962,677 | France | Dec. 12, 1949 |